March 22, 1955
J. H. WILLIAMS
2,704,575
WASH-OVER CUTTING AND FISHING TOOL
Filed Dec. 28, 1953
2 Sheets-Sheet 1
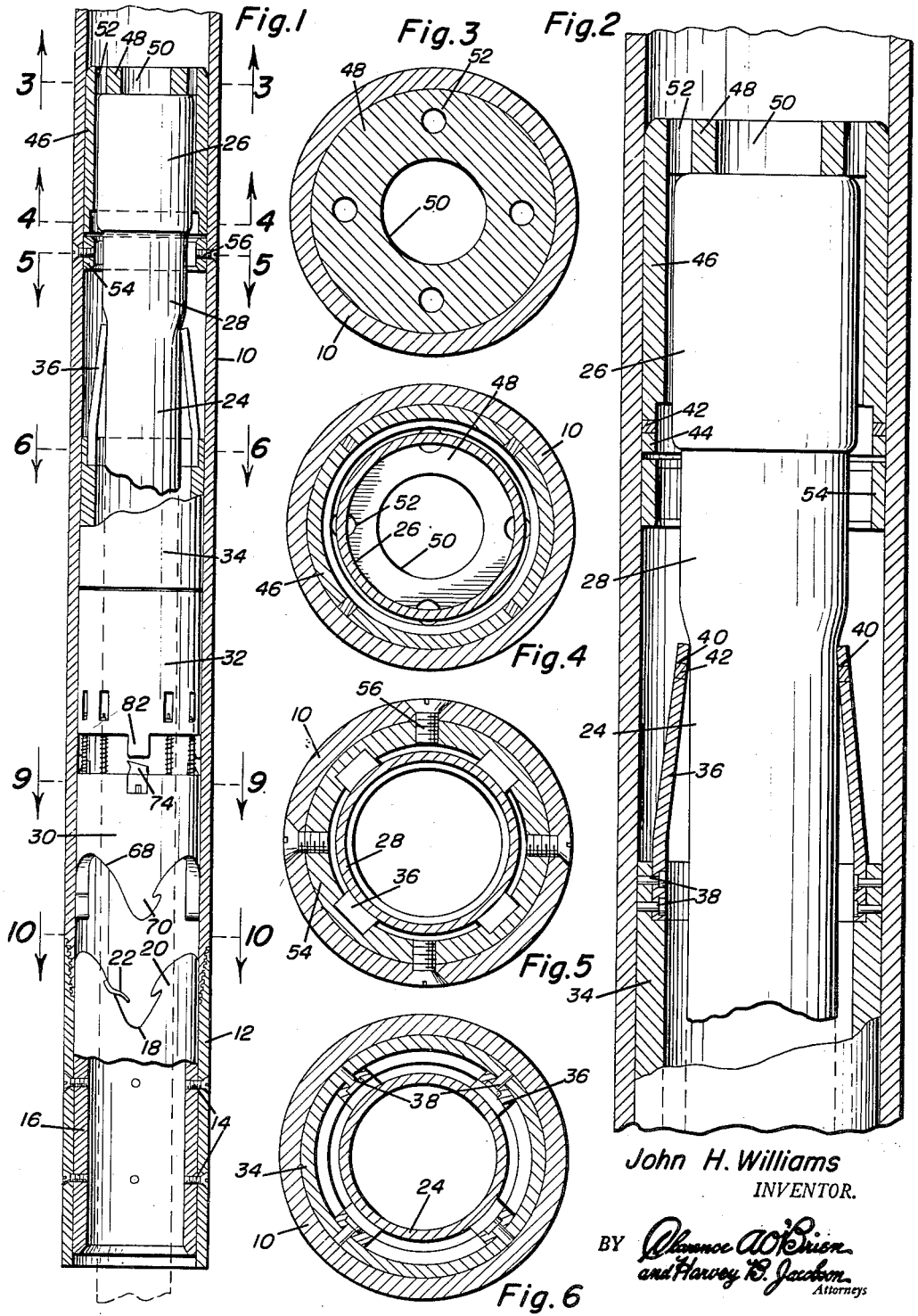
John H. Williams
INVENTOR.

March 22, 1955  J. H. WILLIAMS  2,704,575
WASH-OVER CUTTING AND FISHING TOOL
Filed Dec. 28, 1953  2 Sheets-Sheet 2

John H. Williams
INVENTOR.

BY Clarence A. O'Brien
and Harvey B. Jacobson
Attorneys

United States Patent Office 2,704,575
Patented Mar. 22, 1955

2,704,575

WASH-OVER CUTTING AND FISHING TOOL

John H. Williams, Opelousas, La.

Application December 28, 1953, Serial No. 400,430

9 Claims. (Cl. 164—.6)

This invention comprises novel and useful improvements in a wash-over cutting and fishing tool and more specifically pertains to a device to effect removal of a fish from a well bore in an improved manner.

The primary purpose of this invention is to simplify and improve the operation of cutting and removing a fish from a well bore by providing an apparatus whereby the wash-over of a fish and the severing and removing of the fish may be performed in a single trip with a consequent great saving in time and expense.

A further important object of the invention is to provide an apparatus in conformity with the foregoing objects which will admit of continuous and uninterrupted flow of the wash-over fluid through the tool during the entire operation of the same, thus permitting the wash-over operation, the severing of the fish and the retrieving of the fish from the well bore to be performed in a single trip and by a single apparatus.

A still further important object of the invention is to provide an improved mechanism for selectively placing the knife assembly of the apparatus into interlocking engagement with the tool stem for performing the severing operation.

Yet another specific object of the invention is to provide an improved wash-over, severing and fishing tool which shall include a single member having the combined functions of supporting and retaining the knife assembly in its inoperative position during the wash-over operation and the positioning of the fishing tool about a fish; will assist in effecting the release of the knife assembly to permit operation of the latter when desired; which will assist in positioning the severing and retrieving elements of the tool at a desired position upon a fish; and which will assist in maintaining a continuous flow of the wash-over fluid through the apparatus during its presence in a well bore.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary vertical sectional view through the novel wash-over and cutting tool forming the subject of this invention, the position of the tool in place upon the upper end of a fish being shown therein and the knife assembly being shown in its disengaged position from the abutment cap of the device but prior to its interlocked driving engagement with the drill stem;

Figure 2 is an enlarged detailed view of a portion of Figure 1, being taken at right angles to Figure 1;

Figures 3–6 are horizontal sectional detail views taken upon an enlarged scale substantially upon the planes indicated by the section lines 3—3, 4—4, 5—5 and 6—6 respectively, of Figure 1;

Figure 8:
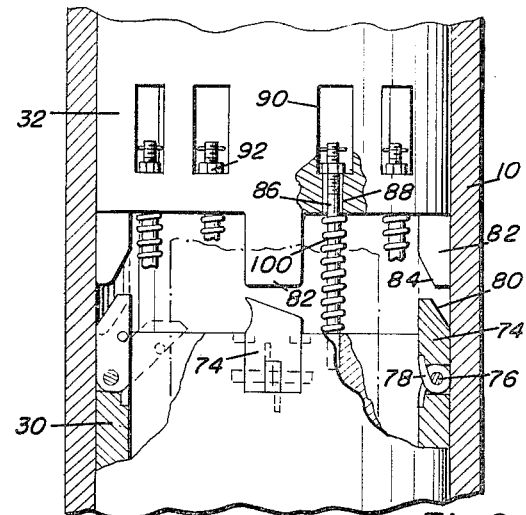
Figure 9:
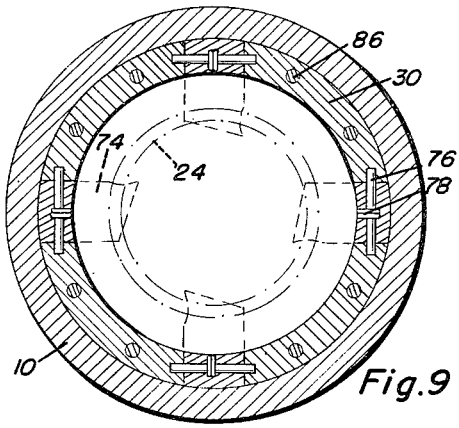
Figure 10:
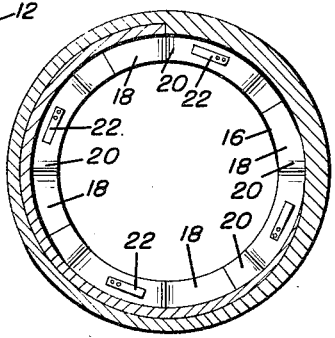

Figure 8 is an enlarged detailed view, parts being broken away and shown in section and alternative position of parts being shown in dotted lines therein, the view being of adjacent portions of the plunger and knife carriages and their resilient means; and, Figures 9 and 10 are horizontal sectional views taken upon enlarged scales substantially upon the planes indicated by the section lines 9—9 and 10—10 of Figure 1.

When the lower portion of a drill stem or other rod-like article becomes stuck in the bottom of a well bore so that the same cannot be withdrawn, and becomes separated from its upper portion leaving the bottom portion in the well bore, it is necessary to remove the stuck object, known as a fish. In order to remove or recover this fish it is customarily necessary to perform a wash-over operation to clear the mud from about the fish stuck in the bottom of a well bore and thereafter to perform a second operation for severing the fish, preferably adjacent its lower end, and retrieving and withdrawing this severed portion. Customarily these two operations are performed successively, involving separate and successive trips of the tools into and out of the well bore. The first operation usually involves the attaching of a wash-over pipe to a tool stem and lowering this pipe into the well bore and telescopingly over the over end of the frozen fish, while discharging wash-over fluid through the lower end of the wash-over pipe from the tool stem to clear away the mud about the fish. When such mud has been cleared away, the wash-over pipe is removed and a fish severing and retrieving tool is then attached to the lower end of the tool stem and the same is then reinserted into the well bore, the fishing tool likewise telescopingly embracing the upper end of the fish and thereafter being manipulated to cause knife members to sever the fish and retrieve and withdraw the same.

There have also been developed combined wash-over and fishing devices wherein a single tool, attached to the lower end of a tool stem, serves to perform the wash-over operation and in the same trip also is effective to sever and retrieve the fish. Such an apparatus is disclosed in the patent to Waggener, 2,398,981 issued April 23, 1946.

The present invention constitutes an improvement over this type of apparatus, by providing an improved means for engaging the top of the fish and releasing the knife assembly of the invention while effecting a continuous flow of the wash-over fluid through the device, together with an improved interlocking driving connection between the tool stem and the knife assembly.

Figure 7:
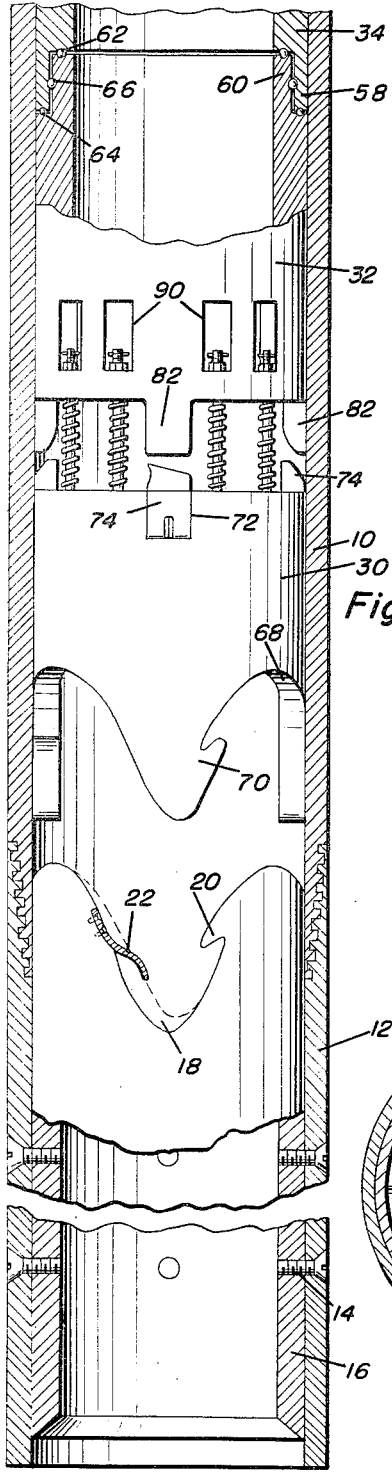
Figure 7 is an enlarged detailed view of the lower portion of Figure 1, parts being broken away.

Referring now more specifically to the accompanying drawings, wherein like numerals designate similar parts throughout the various views, it will be seen that the apparatus disclosed in the present drawings as an exemplification of the principles of this invention consists of a cylindrical barrel 10 which at its upper end, not shown, is adapted to be detachably secured to the lower end of a tool stem whereby the device may be raised and lowered with the tool stem through the usual Kelly connection and may be rotated thereby as desired. The barrel is open at its lower end and is externally threaded for the reception of a foot member 12 which is in the form of a sleeve forming a continuation of the barrel and which foot member is in turn open at its lower end as shown in Figures 1 and 7. Rigidly but detachably secured within the foot member 12 adjacent its lower end, as by means of retaining screws 14 is a sleeve 16 which thus rotates with the barrel upon rotation of the tool stem by the rotary of the drilling rig. Upon its upper edge, as shown in Figures 1, 7 and 10, the sleeve 16 is provided with a plurality, four being illustrated in the drawings, of circumferentially spaced axially extending recesses 18. These recesses are provided with overhanging hook portions 20 whereby the recesses constitute hooks or jaws. These hooked recesses constitute driving jaws. Upon the opposite walls of the recesses 18 from the portions 20 are fixedly secured resilient members in the form of leaf springs 22. The function of the driving jaw and spring construction will be more specifically referred to hereinafter.

As so far described, and as viewed in Figure 1, it will be apparent that the barrel, its foot member, the sleeve 16 and the driving jaws may all be telescoped slidably over the upper end of a fish 24, the latter usually constituting the broken lower end of a drill stem which is embedded and stuck in the bottom of a well bore, this fish having a coupling member 26 disposed upon a coupling shoulder 28 thereon. Normally freely slidable and freely rotatable within the barrel 10, except in certain special circumstances as set forth hereinafter, is a knife assembly. This consists of a plurality of interconnected sleeves, the lower sleeve 30 of which constitutes a knife carriage, the intermediate sleeve 32 comprising a plunger carriage and the upper sleeve 34 constituting a swivel head. A plurality of axially extending and upwardly converging spring fingers 36 are secured in a counter-sunk recess at the upper end of the swivel head 34 as by rivets or the like 38. The fingers 36 have an inherent bias whereby they normally will be urged towards and in engagement with the fish, as shown in Figures 1 and 2.

At the upper ends the fingers 36 are apertured as at 40 for the reception of shear pins 42 by which the fingers are detachably secured to the lower sleeve portion 44 of a cylindrical member 46 comprising an abutment cap. Portions of the severed shear pins 42 are shown in Figure 2, the parts being in the position when the fingers 36 have been separated from the abutment cap 46 by shearing of these pins.

The abutment cap 46 has a top wall 48 provided with a central aperture 50 and a plurality of circumferentially spaced apertures 52 adjacent the perimeter of the top wall. The sleeve-like abutment cap 46 is of such internal diameter as to be loosely receivable upon the coupling member 26 of the fish and to have the underside of its top wall 48 abutted by the top surface of the fish as the device is lowered into a well bore, as shown in Figures 1 and 2.

In its assembled position within the barrel 10, and ready for lowering into a well bore after the barrel has been secured to the lower end of a tool stem, is the knife assembly consisting of the connected members 46, 36, 34, 32 and 30. A lock ring 54 is positioned within the barrel 10, being removably retained therein as by fastening screws 56. This lock ring provides a stop for the lower end of the abutment cap 46 thus limiting downward travel of the abutment cap which is slidably disposed within the barrel 10; and upon its bottom portion constitutes a stop which limits upward travel of the upper end of the swivel head 34. It will thus be evident that after the tool has been lowered into a well bore and telescoped upon the upper end of a fish, so that the lower surface of the top wall 48 of the abutment cap 46 rests upon the top of the fish, continue with downward movement of the barrel 10 will cause the barrel to slide downwardly over the now stationary knife assembly. This relative sliding movement between the knife assembly and the barrel will eventually cause the upper edge of the swivel head 34 to engage the undersurface of the stop ring 54 thereby halting further relative movement between the barrel 10 and the fingers and the rest of the knife assembly supported thereby, until the increasing weight of the descending barrel breaks the shear pins 42. At this time the knife assembly is released from the abutment cap and is freed for movement into its operative position as set forth hereinafter.

Referring now to Figure 7 it will be seen that the swivel head 34 is attached to the upper end of the plunger carriage 32 in such a manner as to permit relative rotation between these members but prevent axial movement with respect thereto. For this purpose the adjacent ends of the sleeves 32 and 34 are provided with overlapping joints or shouldered portions 58 and 60, respectively. Upper and lower thrust bearing assemblies 62 and 64 are positioned between the horizontal surfaces of the sleeves as shown in Figure 7 to facilitate relative rotation between these members, while a further bearing assembly 66 is disposed in annular complementary grooves formed in the overlapping surfaces of the two portions 58 and 60 to facilitate anti-friction rotation between the surfaces but to prevent axial displacement thereof. By this construction it will be seen that the swivel head is secured to the plunger carriage 32 but is freely rotatable with respect thereto.

Referring now specifically to Figure 7 it will be seen that the knife carriage 30 is provided upon its lower edge with circumferentially spaced axially extending recesses 68 which are fully complementary to the recesses 18 of the sleeve 16, being likewise provided with overhanging hook portions 70. The hooked recesses constitute driven jaws for the knife assembly.

The arrangement is such that when the knife carriage 30 is sufficiently lowered, its hooked recesses will engage those of the sleeve 16 whereby the driving and driven jaws will be interlocked so that rotation of the barrel 10 by the tool stem will in turn produce rotation of the knife carriage 30. The springs 22 previously mentioned serve to retain the portions 70 and 20 in interlocked engagement, once these members have been engaged by the axial movement of the knife carriage toward the sleeve 16.

Upon its upper edge the knife carriage 30 is provided with circumferentially spaced axially extending notches 72. As shown more clearly in Figure 8 each of these notches receives a knife 74 which is pivoted to the knife carriage by transversely extending pivot pins 76. Springs 78 are operatively associated with the knives and with the knife carriage to yieldingly urge the knives into their axially extended position, shown in full lines in Figure 8, which is the inoperative position of the knives. The top sides of the knives are bevelled as at 80 to provide a camming surface. A plurality of plungers 82, carried by and depending from the lower end of the plunger carriage 32 are provided, these plungers having inclined camming surfaces 84. The plungers are so disposed that when the plunger carriage 32 is moved toward the knife carriage 30, the cam surfaces 84 of the plungers will engage the inclined surfaces 80 of the knives and will pivot the knives downwardly from the axial into their radial position as shown in dotted lines therein. When the knives are in their radial position, as shown in Figure 9, they are operatively disposed for cutting engagement with the fish 24.

Means are provided for yieldingly connecting the plunger carriage to the knife carriage. This means consists of a plurality of bolts 86 having their lower ends threadedly engaged in the upper surface of the knife carriage 30, and having their upper ends slidably received in bores 88 extending upwardly from the lower edge of the plunger carriage 32. These bores open into elongated notches or slots 90, whereby lock nuts 92 may be applied to the upper ends of the bolts. Compression springs 100 encircle the bolts between the two carriages to yieldingly urge the latter apart, and the above mentioned nuts 92 provide a means for adjusting the spacing between the two carriages.

It will be apparent that this resilient connection between the two carriages allows the plunger carriage to be moved axially toward the knife carriage to cause the above-mentioned engagement of the plungers with the knives for urging the latter into their operative position.

From the foregoing, it is believed that the operation of the invention will now be readily understood. With the device attached to the lower end of a tool stem, the device is lowered into a well bore causing the tool to telescope over the upper end of the fish 24 in the manner shown in Figures 1 and 2. During this trip into the bore, wash-over fluid is continuously supplied through the tool stem, through the openings 52 of the abutment cap 46, and through the space between the fish and the barrel for washing the fish and removing mud from around the same. It will be appreciated that this washing operation may be continued, if desired, throughout the entire time that the apparatus is disposed in the well bore and the fish is retrieved and removed from the bore.

The tool is lowered until the abutment cap engages the upper end of the fish as shown in Figures 1 and 2 At this time further downward movement of the knife assembly is halted since the same rests upon the fish. Continued downward travel of the barrel 10 now causes the latter to slide downwardly over the knife assembly until the lower surface of the stop ring 54 of the moving barrel engages the upper surface of the swivel head 34. Further downward movement now ruptures the shear pins and moves the knife assembly downward, the released spring fingers 36 slipping downwardly over the fish until they drop below the coupling 26 or the shoulder 28 of the fish. After the wash-over has been completed, the barrel is lifted, until the upper edges of the fingers 36 engage under the shoulder 28 or the coupling 26. This engagement of the fingers prevents further upward movement of the knife assembly and further upward movement of the barrel now moves the locking sleeve 16 upward until the driving and driven jaws are interlocked and engaged. Still further upward travel causes the knife carriage 30 to move towards the plunger carriage, whereby the plungers in the manner above described, will bias or urge the knives from their axial to their radial position. With the knives operatively disposed, the tool stem is rotated by the rotary and through the interlocked driving connection of the sleeve 16 with the knife carriage 30, rotation of the latter is effected, whereby as indicated in Figure 9, the knives will sever the fish. Upon raising the barrel and tool stem, the knives will retrieve and lift the severed fish from the well.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A wash-over cutting and fishing tool comprising a barrel adapted for attachment to a tool string and a knife assembly slidable within said barrel, said barrel and knife assembly being hollow for slidingly embracing a fish, said knife assembly including an abutment cap adapted to seat upon the upper end of a fish, a knife carriage having knives pivotally mounted thereon, a plunger carriage connected to and supporting said knife carriage and having plungers operative engageable with said knives, a swivel head swivelly connected to and supporting said plunger carriage, resilient fingers mounted on said swivel head, a rigid but easily frangible connection between said fingers and said abutment cap, a stop ring in said barrel mounted for engagement by said knife assembly for rupturing said connection and releasing said knife assembly from said abutment cap, means for drivingly connecting said knife assembly to said barrel for rotation therewith, means for effecting flow of wash-over fluid from a tool strung through said barrel and knife assembly for wash-over of a fish.

2. The combination of claim 1 wherein said last means includes apertures extending through said abutment cap.

3. The combination of claim 1 including a foot member secured to the lower end of said barrel, said penultimate means including driving jaws on said foot member and driven jaws on said knife carriage.

4. The combination of claim 1 including a foot member secured to the lower end of said barrel, said penultimate means including driving jaws on said foot member and driven jaws on said knife carriage, resilient means retaining said driving and driven jaws in interlocked engagement.

5. The combination of claim 1 including a foot member secured to the lower end of said barrel, said penultimate means including driving jaws on said foot member and driven jaws on said knife carriage, said foot member having a sleeve secured to its inner surface, said driving jaws comprising circumferentially extending hooked recesses in the upper end of said sleeve, said knife carriage having hooked recesses to said driving jaws and constituting said driven jaws, resilient means retaining said driving said driven jaws.

6. The combination of claim 1 including a foot member secured to the lower end of said barrel, said penultimate means including driving jaws on said foot member and driven jaws on said knife carriage, said foot member having a sleeve secured to its inner surface, said driving jaws comprising circumferentially extending hooked recesses in the upper end of said sleeve, said knife carriage having hooked recesses to said driving jaws and constituting said driven jaws, resilient means retaining said driving and driven jaws in interlocked engagement.

7. The combination of claim 1 including connecting means for yieldingly retaining said plunger and knife carriages in spaced relation.

8. The combination of claim 1 wherein said swivel head and said plunger carriage have overlapping surfaces, a ball assembly rotatively securing said overlapping surfaces together for rotation but preventing axial movement.

9. The combination of claim 1 wherein said knives are pivoted upon said knife carriage for vertical pivoting movement between an axial, inoperative position and a radial operative position, a spring yieldingly urging each knife into its axial position, said plungers being disposed upon said plunger carriage for engagement of each plunger with one of said knives for urging the latter to its radial position upon movement of said plunger carriage towards said knife carriage.

No references cited.